J. W. LAMBERT.
CHAIN TREAD FOR TRACTORS.
APPLICATION FILED OCT. 4, 1918.
1,300,282.
Patented Apr. 15, 1919.
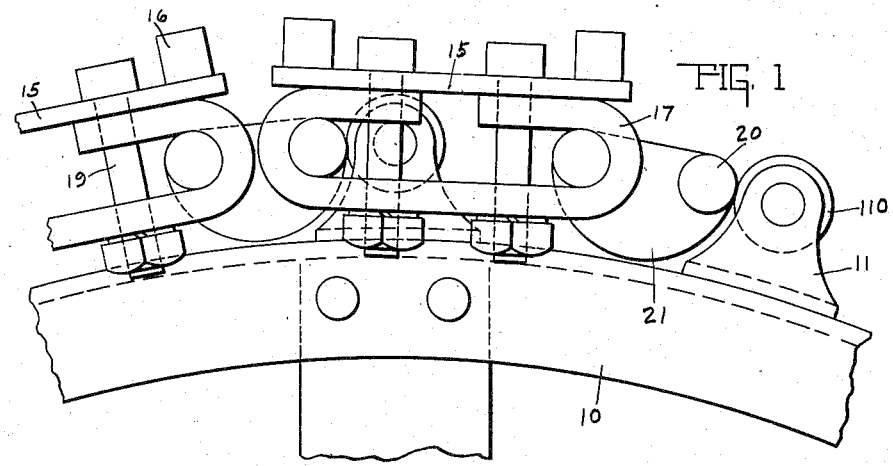
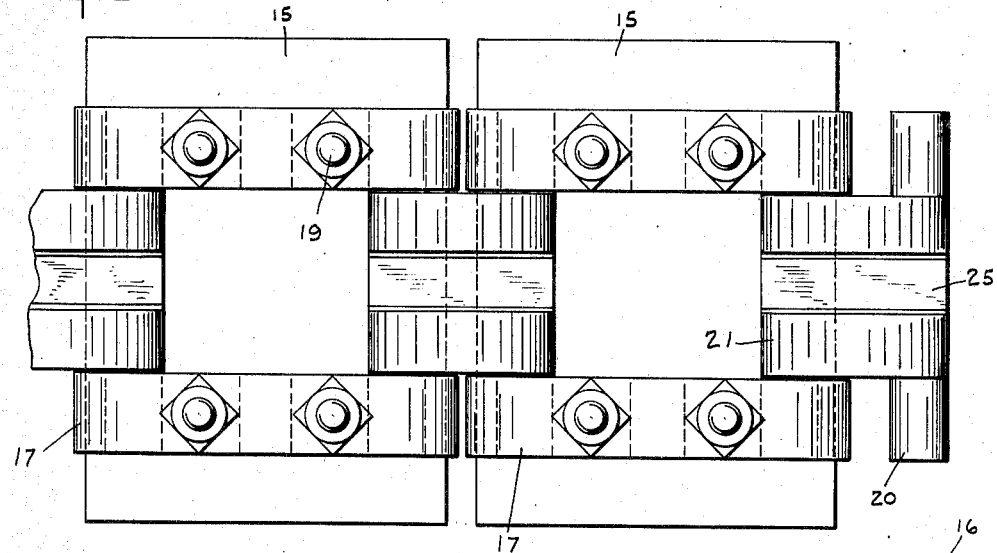
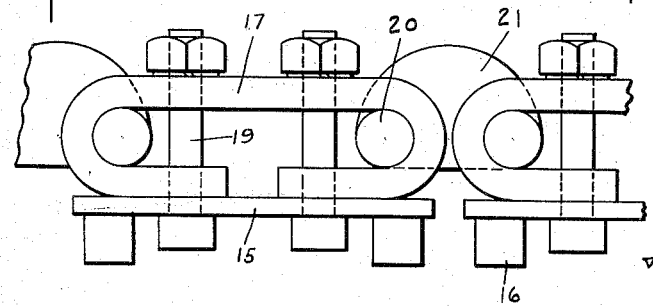
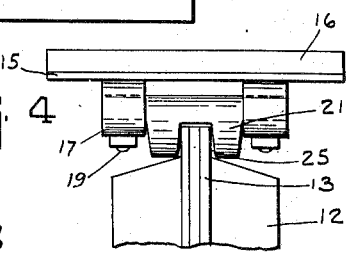
INVENTOR.
JOHN W. LAMBERT
BY
ATTORNEY.

UNITED STATES PATENT OFFICE.

JOHN W. LAMBERT, OF ANDERSON, INDIANA.

CHAIN TREAD FOR TRACTORS.

1,300,282.　　　　Specification of Letters Patent.　　Patented Apr. 15, 1919.

Application filed October 4, 1918.　Serial No. 256,855.

*To all whom it may concern:*

Be it known that I, JOHN W. LAMBERT, a citizen of the United States and a resident of Anderson, county of Madison, and State of Indiana, have invented a certain new and useful Chain Tread for Tractors; and I do hereby declare that the following is a full, clear, and exact description thereof, reference being had to the accompanying drawings, in which like letters refer to like parts.

This invention relates to a chain tread for tractors. The object of the invention is to make a very strong and yet a very simple and economical form of chain tread and also to make the chain tread suitable for use on ordinary tractors, such as the Fordson tractor, so as to convert them, if desired, from the simple tractor form to the caterpillar form.

One feature of the invention consists in forming the chain tread so that the main link will project over the tread plates and be spaced apart to receive the teeth of the drive wheel. The connecting links thereof will constitute the teeth of the chain and be in position to engage the teeth of the drive wheel. This obviates the necessity of providing a special tooth on each tread plate of the chain tread.

Another feature of the invention consists in so forming said connecting link that it would have a longitudinally extending groove to fit on the central, outwardly extending rib on the outer periphery of the steering wheels of ordinary tractors. This is to adapt the chain tread for converting ordinary tractors to those of the caterpillar type.

Still another feature of the invention consists in forming integrally with the connecting link laterally extending pins for engaging the links secured on the sections of the chain tread. This simplifies and cheapens as well as strengthens the tractor.

The full nature of this invention will be understood from the accompanying drawings and the following description and claims:

In the drawings Figure 1 is a side elevation of a portion of a main or drive wheel of a tractor and a portion of the chain tread forming this invention, in position thereon, parts being broken away. Fig. 2 is a plan view of an inner surface of a portion of the chain tread. Fig. 3 is a side elevation of a portion of the chain tread as it appears on the underside of the drive wheel. Fig. 4 is a transverse section through the rim of a steering wheel of an ordinary tractor and the chain tread forming this invention mounted thereon.

There is shown in Fig. 1 the drive or main wheel of an ordinary tractor which has been provided on its periphery with teeth, each consisting of a roller 10 and a bracket 11 carrying the roller and secured on the periphery of the wheel. But this invention is not necessarily limited to any particular construction of the main or drive wheel of the tractor.

There is also shown herein a front or steering wheel 12 of an ordinary tractor, which has a central rib 13 extending around. The chain tread herein is invented for use in connection with such tractor wheels.

The chain tread has transversely extending plates or sections 15, extending for the full width thereof, and the outer surfaces are provided with transversely extending cleats 16. On the inner surface of each plate 15 a pair of main links 17 are secured, one near each edge of the plate and projecting therefrom so as to leave a space between them to receive the tooth of the drive wheel, and each link being formed of a strip of metal with its ends bent toward each other and the ends are preferably secured adjacent to plate. These links are secured to the plate by bolts 19, which extend through both the inner and outer sides of the links as seen in Fig. 3. This leaves an eye at each end of each link to receive a pin 20, extending laterally from side of a connecting link 21. Each connecting link 21 has two of these pins on each side, spaced far enough away to enter the eyes in the two adjacent corresponding links 17, as shown in Fig. 2. The links 21 and pins 20 are preferably cast integrally, and this mode of constructing a chain tread eliminates two forgings and castings in every link and thus not only strengthens it so the chain tread can be made narrower but also cheapens it. This construction also gives to the link system of the chain tread smooth, lateral surfaces, because the pins 21 do not extend beyond the outside edges of the link 17. This renders it unnecessary to provide extra guide plates outside the links 17 and 21 to protect them or to form a guide way for guide wheels or the like which may be employed to travel upon the chain tread, particularly on the lateral portions of the plates 15 thereof.

The link 21 is curved longitudinally, as shown in Figs. 1 and 3, on the inner side thereof, so that it serves as the tooth of the chain tread to engage the teeth 110 of the main wheel 10, as appears in Fig. 1. This makes it unnecessary, as in previous constructions of chain treads, to provide a tooth on each plate or section 15, and thus simplifies, cheapens and also strengthens the chain tread.

The connecting link 21 is also provided with a longitudinally extending groove 25 therein on the inner curved surface thereof and centrally located for the purpose of enabling the links 21 to fit over the rib 13 on the front wheel 12 on the machine which has been converted from the usual tractor form to the caterpillar type. This not only enables said chain tread to operate on such a wheel but it prevents the chain tread from having interlateral movement and insures its continued operation on such type of wheel.

In addition to the many advantages above stated, this construction of chain tread operates without any lubricant whatever, and thus reduces the cost of operation and keeps the chain tread clean.

The invention claimed is:

1. A chain tread for tractors, including tread plates, a pair of parallel main links secured on each tread plate so as to project therefrom and leave a space between them adapted to receive the tooth of the drive wheel of the tractor, and connecting links for uniting the main links on adjacent tread plates, each connecting link projecting inwardly so that it will constitute a tooth for coöperating with the teeth on the drive wheel of the tractor.

2. A chain tread for tractors, including tread plates, a pair of parallel main links secured on each tread plate so as to project therefrom and leave a space between them adapted to receive the tooth of the drive wheel of the tractor, and connecting links for uniting the main links on adjacent tread plates, each connecting link having its inner surface curved longitudinally of the chain tread so it will serve as a tooth to coöperate with the teeth of the drive wheel of the tractor.

3. A chain tread for tractors, including tread plates, a pair of parallel main links secured on each tread plate so as to project therefrom and leave a space between them adapted to receive the tooth of the drive wheel of the tractor, and connecting links for uniting the main links on adjacent tread plates, each connecting link having laterally and outwardly extending integral pins for engaging the main links secured on the tread plates.

4. A chain tread for tractors, including tread plates, a pair of links secured on each tread plate, and connecting links for uniting the links of adjacent tread plate links, each connecting link having a longitudinal groove located centrally in the inner surface thereof in position to fit over the rib of a wheel as the chain tread travels.

5. A chain tread for tractors, including tread plates, a pair of parallel main links secured on each tread plate so as to project therefrom and leave a space between them adapted to receive the tooth of the drive wheel of the tractor, and connecting links for uniting the main links on adjacent tread plates, each connecting link having laterally and outwardly extending integral pins for engaging the main links secured on the tread plates, said pins being arranged so that they do not extend beyond the lateral edges of the links on the tread plates, whereby the lateral edges of the linkage on said chain tread will be free from projections.

In witness whereof, I have hereunto affixed my signature.

JOHN W. LAMBERT.